May 7, 1968            L. C. BIXBY            3,381,355
METHOD OF SCREEN ASSEMBLY
Original Filed Aug. 19, 1963
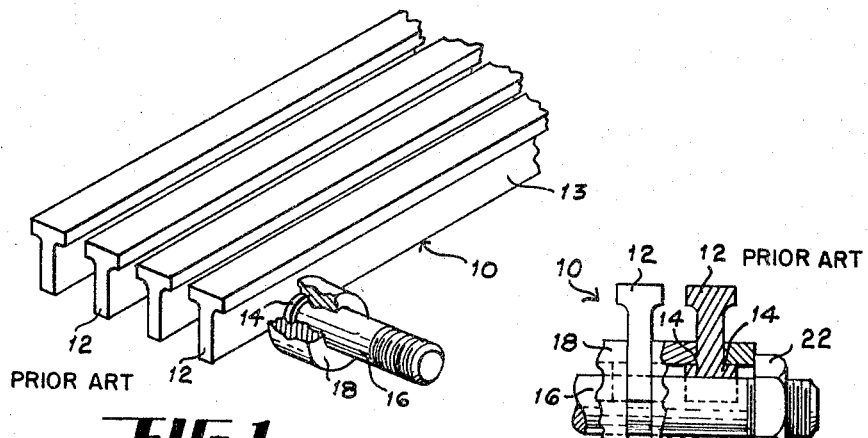
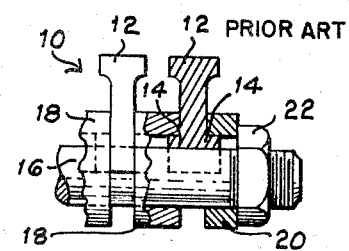
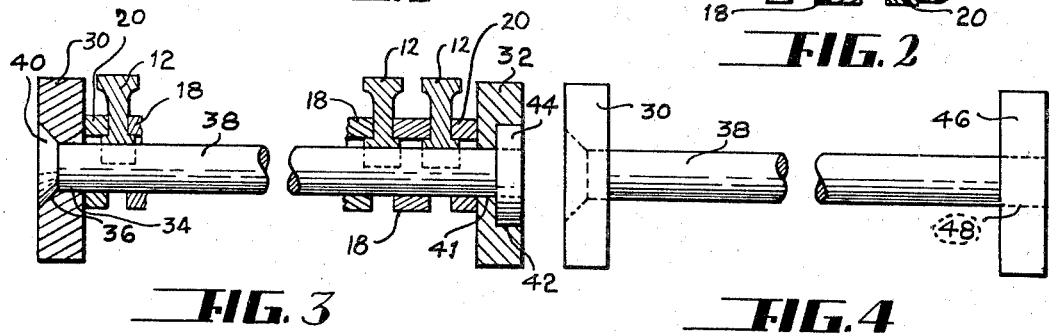
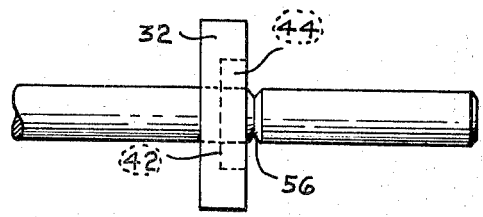
INVENTOR.
LEON C. BIXBY
BY Dybvig and Dybvig
HIS ATTORNEYS United States Patent Office 3,381,355
Patented May 7, 1968

3,381,355
METHOD OF SCREEN ASSEMBLY
Leon C. Bixby, Wellington, Ohio, assignor to Wedge Wire Corporation, Wellington, Ohio, a corporation of Ohio
Original application Aug. 19, 1963, Ser. No. 302,818. Divided and this application Nov. 4, 1966, Ser. No. 608,470
2 Claims. (Cl. 29—160)

ABSTRACT OF THE DISCLOSURE

A screen is assembled by freely passing the ends of headed support rods for the screen through apertures in a side bar which defines one margin for the screen, assembling wire elements with spacers therebetween on the support rods and forcibly sliding means on the unheaded ends of the support rods to retain the assembled wire elements and spacers on the support rods. The means forcibly slided onto the support rods may comprise a second side bar having apertures forcibly receiving the support rods and which defines an opposite margin for the screen or may comprise individual bushings forcibly slided onto the support rods. To facilitate assembly, the unheaded ends of the support rods are weakened by an annular groove which defines removable extensions at the unheaded ends of the support rods. The means slided onto the support rods, such as the mentioned second side bar or bushings, are slided across the weakening groove in each support rod to permit breaking away of the support rod extensions.

---

This is a division of application Ser. No. 302,818, filed Aug. 19, 1963, now abandoned.

This invention relates to a method of making a frame for a screen and more particularly to a method of making a frame for industrial screens of the type used in coal washing applications and the like, however, the invention is not necessarily so limited.

In Patent No. 2,967,620, issued Jan. 10, 1961, I have disclosed an improved industrial screen, comprising wire elements supported in spaced parallel relation on transverse supporting rods. This screen is characterized by the special benefit that individual wire elements of the screen may be removed for repair or replacement without disassembly of the entire screen.

An object of the present invention is to provide a new and improved method of making a frame for use in supporting such screens and which is especially designed for partial disassembly of the frames to enable easy repair and replacement of the wire elements in the screen.

Another object of the present invention is to provide a new and improved method of making a frame for industrial screens which is assembled with parts that have a drive fit.

A further object of this invention is to provide a new and improved method for assembling frames for industrial screens.

With reference to the screen disclosed in the aforementioned Patent No. 2,967,620, such screen is characterized by support rods having nuts threaded on the ends thereof and which are used in retaining the parts of the screen in their assembled relation on the support rods. It is found in practice that the ends of the support rods with the nuts thereon, which project from the sides of the screen, complicate the mounting of such screens in the apparatus in which they are to function. Thus, the laterally projecting nuts create open gaps at the sides of the screen through which material being washed or otherwise treated on the screen can flow.

It is therefore a further object of the present invention to provide a frame for supporting industrial screens having side members effective to prevent leakage of material over the sides of the screens and presenting smooth outer faces for convenient mounting of the screens in the apparatus in which they are to function.

Other objects and advantages reside in the construction of parts, the combination thereof, the method of manufacture and the mode of operation, as will become more apparent from the following description.

In the drawings, FIGURE 1 is a fragmentary perspective view with a portion broken away, illustrating the construction of a screen in accordance with Patent No. 2,967,620.

FIGURE 2 is a fragmentary end elevational view of the screen of FIGURE 1.

FIGURE 3 is a sectional view of the preferred embodiment of a frame for a screen of the type illustrated in FIGURES 1 and 2, which frame embodies the present invention, the central portion of the frame having been broken away to reduce the size of the illustration.

FIGURE 4 is an end elevation of a first modification.

FIGURE 5 is an end elevation of a second modification.

Referring to the drawing in greater detail, the patented screen of FIGURES 1 and 2 is designated by the reference numeral 10. This screen comprises elongate wire elements 12, each having a generally T-shaped configuration. At spaced intervals, each wire element 12 has been coined to provide an arcuate recess in the edge of its base flange 13. This coining operation also produces a laterally projecting arcuate shoulder 14 on each side of the recess. The purpose of the coining which forms the shoulders 14 is to provide a means for seating the wire elements 12 on transverse support rods 16, one of which is shown in each of FIGURES 1 and 2. The shoulders 14 further provide a means for interengaging the wire elements with annular spacers or bushings 18 encircling the support rods 16.

It will be understood that FIGURES 1 and 2 illustrate only a fragmentary portion of the screen and that in practice the screen may include a plurality of equally spaced parallel transverse support rods 16 underlying the wire elements 12 and that for each support rod, each wire element 12 will have an appropriately coined pair of shoulders 14.

As shown in FIGURE 2, a spacer 18 is disposed intermediate each pair of adjacent wire elements 12 and the laterally projecting shoulders 14 on each wire element 12 are seated inside the intermediate spacer.

A plurality of the wire elements 12 and spacers 18 are seated on each support rod 16. At the extreme sides of the screen thereby formed, spacers 20 having a reduced axial thickness are used, since these receive shoulders 14 in only one side thereof.

In accordance with Patent No. 2,967,620, the screen of FIGURES 1 and 2 is completed by threading nuts 22 onto the ends of the support rods 16. These nuts are drawn onto the support rods sufficiently that they compress the wire elements 12 and the spacers 18 and 20 along the lengths of the support rods 16, thereby taking up any play between the wire elements and the spacers and producing a screen which is substantially rigid.

As previously mentioned, a difficulty sometimes encountered with the mode of construction illustrated in FIGURES 1 and 2 is that the nuts 22 project outwardly from the sides of the screen and create a region for leakage at the edges of the screen of material being treated on the screen. This problem is aggravated by the fact that in large screens the nuts 22 will undergo a substantial travel on the threaded ends of the rods 16 as the wire elements 12 and the intermediate spacers therefor are drawn into tight contact. As illustrated in FIGURE 2, this can result in an appreciable projection of the ends of the rods 16 beyond the nuts 22.

By use of the frame illustrated in FIGURE 3, this type of problem is avoided. The frame comprises parallel side bars 30 and 32, adapted to extend the length of the screen along each side of the screen. The side bar 30 has bores 34 located at spaced intervals along the length thereof, one bore 34 being provided for each transverse support rod of the screen. Since FIGURE 3 is an end view, only one screen support rod is seen and it is to be understood that several other support rods lie at spaced intervals behind the one seen. Each of the bores 34 is counterbored, so as to form a chamfered recess 36 in the outer face of the bar 30. In each bore 34 the bar 30 is adapted to receive a support rod 38, having a flared head 40 swaged thereon. Preferably, the flare on the head 40 precisely fits the chambered recess 36 and the end of the head is flat, so as to be flush with the plane of the outer face of the bar 30. Further, it is preferred that the diameter of the support rod 38 is slightly less than the diameter of the bore 34, so that this rod fits freely into the bore 34.

The side bar 32 also has a plurality of apertures 41 passing therethrough at spaced intervals. As with the side bar 30, one aperture is provided for each support rod 38 to be used in supporting a screen assembled thereon. The diameter of the bores 41 is slightly larger than the diameter of the support rod 38, so that these rods pass freely therethrough.

Concentric to each of the bores 41 in the side bar 32, the outer face of the side bar is counterbored, to provide a cylindrical recess 42 therein. Each recess 42 is adapted to receive an interfitting annular bushing 44, having a central bore, the diameter of which is substantially equal to the diameter of the support rods 38, whereby the bushings 44 have a drive fit with the support rods 38.

In assembling a screen on the frame of FIGURE 3, the number of support rods 38 required for supporting the screen are positioned in the side bar 30 with the swaged heads 40 of the support rods seated in the recesses 36. A spacer 20 is then positioned on each support rod 38 adjacent the inner face of the side 30. A wire element 12, coined as described, is then positioned on the support rods 38 and the outermost shoulders thereof seated in the spacers 20. Thereafter, successive spacers 18 and wire elements 12 are assembled on the support rods 38 to the desired screen width and, with placement of the last wire element 12 on the support rods 38, spacers 20 are engaged with the outermost shoulders 14 thereon.

With a screen of the desired width assembled on the support rods 38, the side bars 32 are positioned on the ends of the support rods 38 and the bushings 44 fitted into the counterbored recesses 42 in the outer face of the side bar. As previously mentioned herein, the assembly of the spacers and the wire elements 12 on the support rods 38 at this stage of the assembly is loose and can be compressed axially along the lengths of the support rods 38. As a result, the ends of the support rods 38 which are designed to project through the side bar 32 will project into this side bar only a short distance. Thus, the bushings 44 can be fitted partially into their respective recesses 42 at this stage of the assembly without actually driving the bushings 44 upon the ends of the support rods.

The final stage of the assembly can be accomplished by driving the bushings 44 onto their respective support rods one at a time, as with a hammer, thereby compressing the wire elements 12 and their intermediate spacers to a tight fit, while driving the bushings 44 onto the support rods a distance equal to their own axial thickness. As an alternate and preferred mode of assembly, the partially assembled components are placed in a press capable of simultaneously driving all bushings 44 onto the ends of their respective support rods 38, whereby the play or looseness between the wire elements and their intermediate spacers is taken up simultaneously along all of the support rods 38.

As illustrated in FIGURE 3, the axial length of the spacers 20 is preferably such as to provide a gap between the side bars 30 and 32 and the adjacent wire elements 12, which is approximately equal to the gaps between adjacent wire elements 12. Thus, the path for flow of material through the screen is no greater at the side bars 30 and 32 than it is in the intermediate portions of the screen. It is to be noted that with this construction the swaged heads 40 cooperate with the outer surfaces of the side bar 30 to present a smooth planar outer face on the left side of the screen illustrated in FIGURE 3, while on the opposite side of the screen, the outer surface of the side bar 32, together with the bushings 44 and the ends of the support rods 38 received thereon, also present a smooth and planar outer face. These smooth outer faces facilitate assembly of the screens in the apparatus in which they are to function with a minimum of leakage of the material to be treated on the screen.

While FIGURE 3 illustrates side bars having a height above the support rods 38 which is equal to the height of the wire elements 12, it is to be understood that this dimension may be varied and, when required by the apparatus in which the screen is to function, this height may be lesser or greater than the height of the wire elements 12.

A feature of the present construction worthy of special comment is the use of drive fits between the bushings 44 and the support rods 38. In the previously patented screen of FIGURES 1 and 2, threaded nuts 22 were used in lieu of the drive fit bushings 44. This threaded connection is obviously a more positive connection than is obtained with the drive fit bushings, since the former is a type of interference fit, while the latter is a type of friction fit. It is found that in the construction of FIGURES 1 and 2, this more positive connection is required because each nut must support its own load at all times without assistance from any other nut. However, in the construction of FIGURE 3, the side bar 32 distributes the load uniformly on all bushings 44. Thus, no one bushing 44 will, in ordinary operation, receive a load as great as any given nut 22 might receive in a similar operation of the construction of FIGURES 1 and 2. Further, the planar outer faces of the side bars 30 and 32 permit assembly of the screen of FIGURE 3 in tight fitting frameworks which will function to reduce the possibility of failure in the drive fits between the bushings 44 and the support rods 38.

As previously noted, the assembly of wire elements 12 and intermediate spacers on the support rods 38 is initially a loose assembly and the slack in this assembly is taken up by drive fitting the bushings 44 onto the ends of the support rods 38. FIGURE 5 illustrates a modification which is especially designed to accommodate a substantial looseness or slack in the initial assembly. In this modification, modified support rods 50, each having a removable extension 52, are employed. Each support rod 50 has a flared head 54 similar to the head 40 on the previously described support rod 38 and which is adapted to interfit the complementary counterbores in the side bar 30.

As illustrated in FIGURE 5, the extension 52, which is of the same diameter of the support rod 50, is integral with the support rod 50; but is separated therefrom by an annular groove 56 which provides a fracture point between the rod 50 and its extension.

The frame of FIGURE 5 is assembled with the previously described side bars 30 and 32. Upon assembly of wire elements 12 with appropriate spacers on the support rods 50, the side bar 32 is positioned on the extensions 52 of the support rods 50. Bushings 44 are then driven onto the extensions 52 and forced axially along the extensions 52 across the annular grooves 56 to the support rods 50. In this travel, the bushings 44 seat in their respective recesses 42 in the side bar 32, while simultaneously compressing the assembly of wire elements and spacers along the support rods 50 to take up the slack therein.

After the bushings have been drive fitted into place, as described, the extensions 52 are bent with respect to the support rods 50, so as to induce a fracture in the area surrounded by the groove 56, whereby the extensions are removed. The resulting product has a substantially smooth and planar surface at the outer face of the side bar 32, as well as at the outer face of the side bar 30, and is quite similar to the product illustrated in FIGURE 3.

FIGURE 4 illustrates a second modification utilizing the side bar 30 and the support rods 38, previously described. In lieu of the side bar 32 and the drive fit bushings 44 which secured this side bar on the support rods 38 in the preferred embodiment, the modification of FIGURE 4 utilizes a side bar 46 having spaced apertures 48 therein, the interior walls of which are adapted to drive fit directly onto the support rods 38.

This modification offers the advantage of a larger area of friction contact between the side bars 46 and the support rods 38 and, accordingly, offers a more rugged construction.

The assembly of the modification of FIGURE 4 is substantially the same as that of the preferred embodiment, the only essential difference being that in this case the side bar 46 must be driven simultaneously onto all of the support rods 38, as with a press. As described with reference to the embodiment of FIGURE 5, extensions which can be removed from the support rods 38 by fracturing can also be used to facilitate the assembly.

It will be noted that the embodiments described herein result in screen frames which are readily disassembled by forcibly separating the side bars of the frames, so as to slide the elements drive fitting the support rods off the support rods. This is a single operation accomplished with comparatively simple equipment and affords a convenient means for partially disassembling the screens to repair or replace damaged parts thereof.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of assembling an elongate side bar having a plurality of spaced bores therethrough and having enlarged counterbores in one side thereof together with a plurality of elongate support rods as a frame for supporting a screen of the type comprising a plurality of elongate wire elements disposed in substantially parallel and coplanar relation and spacer members engaged with said wire elements for securing said wire elements to the supporting frame, each said support rod having an enlarged head at one end thereof and an integral extension on other end thereof separated from the main body thereof by an annular groove, said method comprising the steps of passing said support rods through the bores of said side bar and seating the enlarged heads of said support rods in said counterbores, assembling said wire elements and spacer members on the portions of said support rods projecting beyond said side bar, forcibly sliding press fitting means onto and along said extensions and then across said grooves to seat said means on said support rods adjacent said annular grooves, and thereafter breaking said extensions from said rods at said annular grooves, said press fitting means cooperating with said side bar to retain said wire elements and spacers on said support rods.

2. The method according to claim 1, wherein said press fitting means is slid onto and along all of said extensions simultaneously.

References Cited

UNITED STATES PATENTS

| 2,261,771 | 11/1941 | Laubenstein. | |
| 2,446,515 | 8/1948 | Weingart. | |
| 2,517,497 | 8/1950 | Lauenstein. | |
| 2,967,620 | 1/1961 | Bixby | 209—395 |
| 3,078,002 | 2/1963 | Rodgers. | |

CHARLIE T. MOON, *Primary Examiner.*